A. Sheldon.
Fence.
No. 73761.  Patented Jan. 28, 1868.
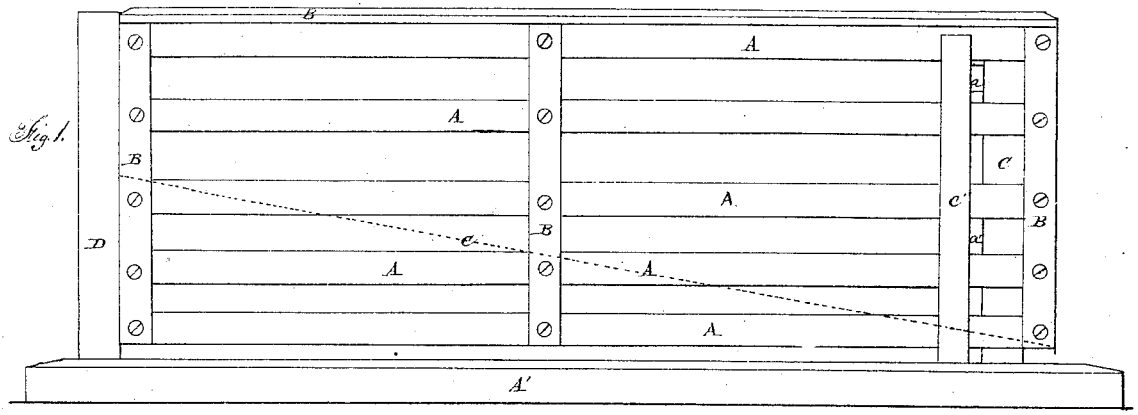
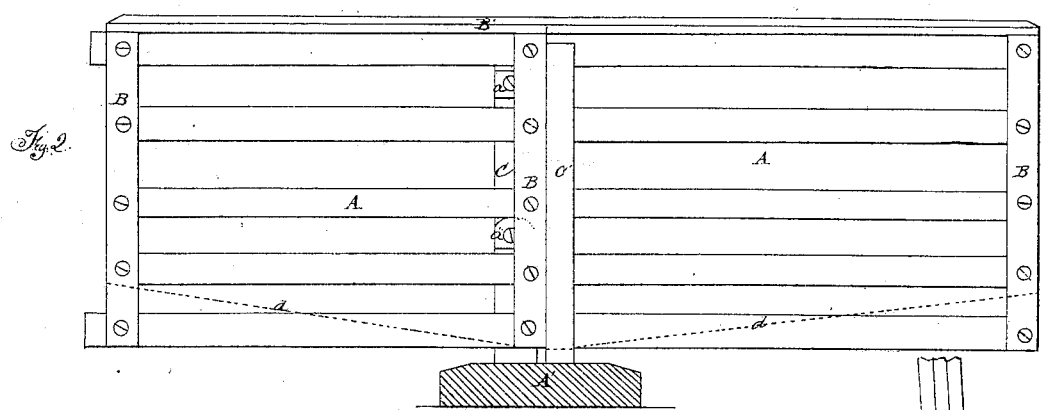
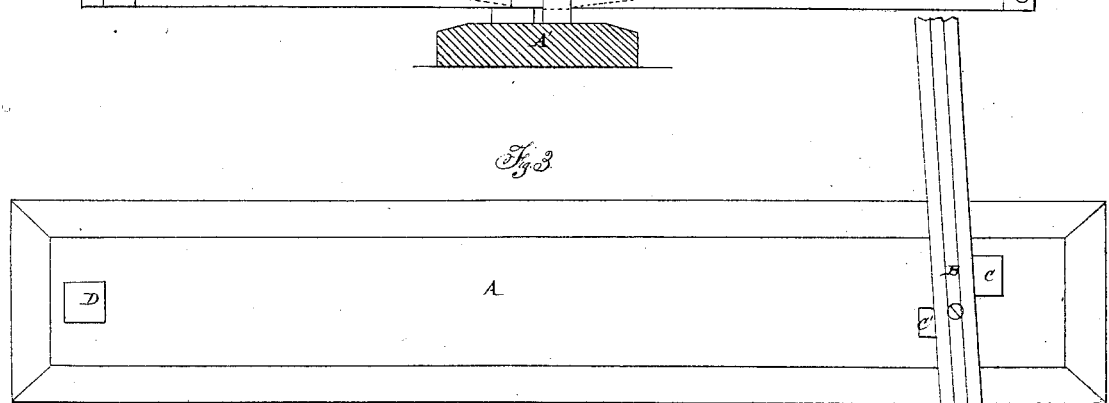
Witnesses
J. Holmes
Frank S. Alden
Inventor
A. Sheldon.

United States Patent Office.

A. SHELDON, OF GREENWICH STATION, OHIO.

Letters Patent No. 73,761, dated January 28, 1868.

IMPROVEMENT IN FENCE.

*The Schedule referred to in these Letters Patent and making part of the same.*

TO ALL WHOM IT MAY CONCERN:

Be it known that I, A. SHELDON, of Greenwich Station, in the county of Huron, and State of Ohio, have invented certain new and useful Improvements in Fence-Gates; and I do hereby declare that the following is a full and complete description of the same, reference being had to the accompanying drawings, making a part of this specification, in which—

Figure 1 is a front view with the gate closed.
Figure 2 is a view of the gate open.
Figure 3 is a top view.
Like letters of reference refer to like parts in the views.

This gate consists of the rails A, joined together by the cross-bars B, a board, B', placed on the top of the gate, as shown. C is a post, secured in the base or ground A'; and placed obliquely with this, as shown in fig. 3, is another post, C', one end of the gate being supported between these posts by means of the bars $a\ a'$, secured to them, and passing between the rails of the gate. The other end of the gate is supported by the post D, the upper and lower rails of the gate extending into openings in said post for this purpose. The projection of one of these rails is made shorter than the other, so that only one has to be guided into place. The longer one passing in first, will steady the gate and allow the shorter one to pass in freely. When the gate is to be opened it is pushed back, and then turned round, as shown in fig. 3, resting on the bar $a'$, fig. 2, which allows it to be swung, as indicated by the dotted lines $d$, fig. 2, up over any obstruction that may be in the way, more easily than if it rested close on the upper rail $a$, the end of the bar $a'$ being rounded, as shown, so as to allow the gate to be turned more readily and without cramping. This gate can also be raised up at one end, as indicated by the dotted line $c$, fig. 1, the end of the lower rail resting in a notch cut in the post D for that purpose, so as to allow small animals to pass through, and still prevent larger ones from getting out.

What I claim as my improvement, and desire to secure by Letters Patent, is—

The bar $a'$, provided with rounded corners, so that the gate on being opened will easily vibrate, as indicated by the dotted lines $d$, thereby allowing it to pass readily over obstructions, in combination with the rails A, cross-bars B, in the manner and for the purpose specified.

A. SHELDON.

Witnesses:
   JNO. LIGGETT,
   SAMUEL GETTLE.